Patented Feb. 13, 1923.

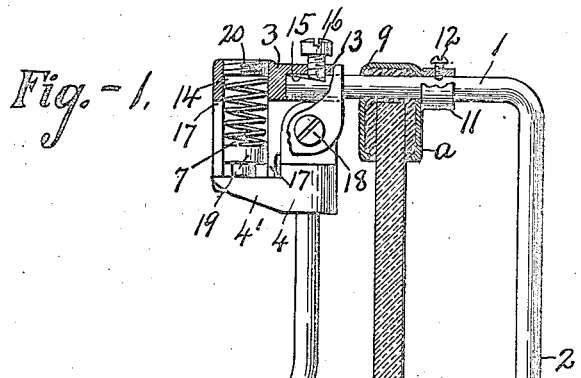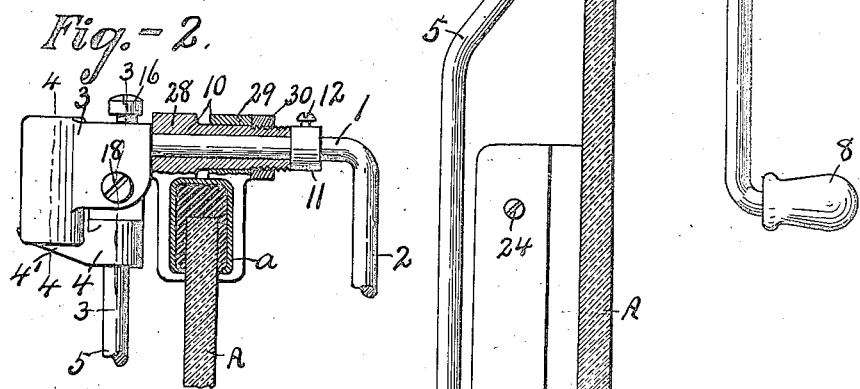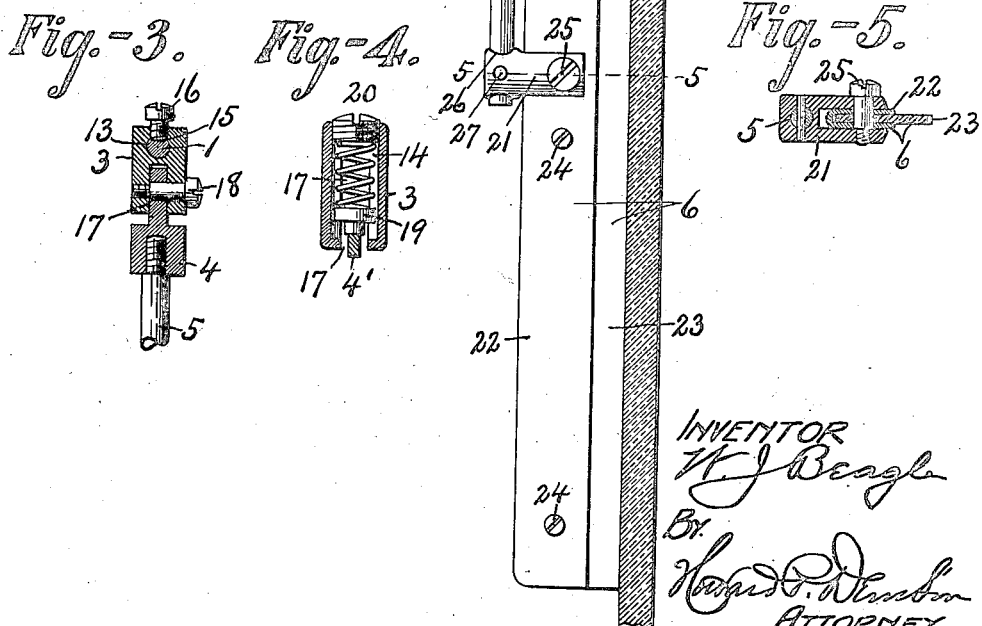

1,445,473

UNITED STATES PATENT OFFICE.

WILLIAM J. BEAGLE, OF SYRACUSE, NEW YORK, ASSIGNOR TO THE STEVER-BEAGLE CORPORATION, OF SYRACUSE, NEW YORK, A CORPORATION OF NEW YORK.

WINDSHIELD CLEANER.

Application filed March 28, 1922. Serial No. 547,401.

*To all whom it may concern:*

Be it known that I, WILLIAM J. BEAGLE, a citizen of the United States of America, of Syracuse, in the county of Onondaga, in the State of New York, have invented new and useful Improvements in Windshield Cleaners, of which the following, taken in connection with the accompanying drawings, is a full, clear, and exact description.

This invention relates to a windshield cleaner involving the use of a rock shaft carrying at one end a wiper-supporting-arm and at its opposite end a hand-lever or crank arm rotatably mounted in a suitable bearing in and upon the windshield frame or glass to be operated by the hand-lever for moving the wiper across the outer face of the glass.

In devices of this character, it is necessary to provide some means for yieldingly holding the wiper against the outer face of the glass in all positions of adjustment, and while I am aware that various means have heretofore been proposed, the main object of this invention is to establish the resilient connection between the wiper-supporting-arm and rock shaft by pivoting said arm to a head on the rock shaft and interposing a spring between opposed shoulders or abutments on the arm and head in such manner as to constantly press the arm with the wiper thereto toward the front face of the windshield.

Another object is to enclose the spring and its abutments in a suitable barrel on the head to protect those parts against rain, snow, dust and other foreign elements.

A further object is to construct the various parts of the cleaner in such manner so as they may be easily and quickly assembled upon each other and attached to the windshield.

Other objects and uses relating to specific parts of the cleaner will be brought out in the following description:

In the drawings:

Figure 1 is a side elevation partly in section of a windshield cleaner embodying various features of my invention together with a portion of a windshield also shown in section.

Figure 2 is a similar side elevation of the upper portion of the cleaner showing in section the modified means for clamping the cleaner to the windshield frame.

Figures 3 and 4 are detail sectional views taken respectively, on lines 3—3 and 4—4, Figure 2.

Figure 5 is a detail sectional view taken on line 5—5, Figure 1.

As illustrated, this cleaner comprises a rock shaft —1—, a hand-lever or crank-arm —2— on one end of the shaft, a head —3— removably secured to the opposite end of the rock shaft, a bell crank lever —4— having a wiper-supporting-arm —5—, a wiper —6— pivotally mounted upon the arm —5— and a coil spring —7— for forcing the arm —5— toward the windshield glass as —A— to hold the wiper —6— in contact therewith, and suitable means for supporting the rock shaft upon the windshield.

The rock shaft —1— and its crank arm —2— are preferably made of heavy steel wire integrally united at their junction one with the other with the crank arm —2— at substantially right angles to the axis of the shaft —1— and provided at its free end with a handle —8—. This rock shaft may be journaled in a transverse opening —9— in the top of the windshield frame —a— as shown in Figure 1 or in a suitable bracket —10— adapted to be clamped to the top rail —a— of the windshield frame as shown in Figure 2 to rock about a horizontal axis, the crank arm or hand-lever —2— being arranged at the rear side of the windshield frame with its handle —8— in easy reaching distance of the driver for rotating the shaft in the bearing —9— or —10—.

A collar —11— is slidable lengthwise of and upon the shaft —1— and may be secured in its adjusted position by a set screw —12— to engage the inner face of the bearing —9— to hold the shaft and parts carried thereby against undue outward displacement, said shaft being of sufficient length to permit it to be used in connection with windshields of different thicknesses.

The head —3— is preferably made of cast metal and is provided with a horizontally extending socket —13— and a transversely extending socket —14—, said socket being disposed in the same plane, the socket —13— serving to receive the adjacent end of the rock shaft —1— which has one side flattened at —15— for engagement by a set screw —16— in the adjacent side of the socket —13— to lock the head —3— to the rock shaft and also to hold said head and rock shaft against relative rotation.

The outer or front end of the head —3— constitutes a barrel extending diametrically across the rock shaft and in which the cylindrical socket or opening is formed, the lower side of said head below the shaft —1— being provided with a central lengthwise slot —17—extending forwardly and rearwardly from end to end and through the lower side thereof, thereby forming a transverse slot in the front side of the barrel for a purpose presently described.

One end of the bell crank lever —4— is inserted in the rear end of the slot —17— and pivoted to the opposite walls thereof by a pivotal screw —18— so as to turn about an axis at right angles to that of the rock shaft —1—, the other arm of said bell crank lever extending diametrically across the lower end of the opening —14— and into the coresponding portion of the front end of the slot —17— or in other words, diametrically across the opening —18— to form an abutment for a spring seat —19— which rests loosely upon the upper face of the adjacent arm as —4'— of the bell crank lever to receive the adjacent end of the spring —7—.

The uper end of the opening —8— is threaded to receive a screw —20— which forms an abutment for the adjacent end of the spring —7— and is adjustable to vary the tension of said spring.

The wiper-supporting-arm —5— is relatively long as compared with the length of the head —3— to extend partially across the front face of the windshield glass —A— and has one end rigidly secured to the bell crank lever —4— and its other end provided with a rearwardly projecting bifurcated bracket —21— for receiving the wiper —6—.

This wiper comprises a U-shaped sheet metal frame —22— and a flexible wiper section —23— of rubber or equivalent flexible material which is inserted between the opposite sides of the frame —22— to protrude some distance rearwardly beyond the adjacent longitudinal edges of the frame to allow it to yield laterally as the frame is moved across the face of the glass.

The opposite sides of the frame —22— are firmly clamped against the adjacent sides of the flexible wiper section —23— by means of a screw —24— passing through said sides and wiper section —23—.

The wiper —6— is elongated in the direction of the arm —5— or substantially radial to the rock shaft —1— and is inserted in the slot of the bracket —21— and pivoted intermediate its ends thereto by means of a pivotal screw —25— passing through registering apertures in the bracket and wiper, said bracket being provided with a diametrically extending aperture —26— in which the adjacent end of the arm —5— is inserted and secured to said bracket by means of a locking pin or key —27— to hold the bracket and arm against relative turning movement.

The slot in the bracket —21— for receiving the wiper is of sufficient length to permit said wiper to rock about the axis of the pivot —25— and thereby to automatically adjust itself to the surface of the windshield glass —A—.

In operation, the spring —7— exerts pressure upon the arm —4'— of the bell crank lever —4— thereby yieldingly forcing the arm —5— toward the windshield glass —A— and yieldingly holding the wiper against said glass so that by rotating the rock shaft —1— by means of the hand crank —2— will cause the wiper to traverse the front face of the glass —A— through an arc of substantially 180 degrees concentric with the axis of the rock shaft —1—.

In Figure 2, the clamp —10— is preferably composed of sections —28— and —29— slidable one upon the other against opposite faces of the upper rail of the windshield frame —a—, the section —28— being provided with a central lengthwise bearing for the rock shaft —1— and preferably extends through an opening in the section —29— and has its outer end threaded and engaged by a nut —30— whereby the two sections may be firmly clamped to the rail—a— without in any way interfering with the free rocking movement of the shaft —1—.

What I claim is:—

1. A windshield cleaner comprising a rock shaft, a head, means for clamping and releasing the head upon and from the rock shaft, means for rocking the shaft, a lever fulcrumed on the head, an arm secured to the lever, a wiper pivoted to the arm, and a spring in the head exerting pressure on the lever to force the wiper into contact with the glass.

2. A windshield cleaner comprising a rock shaft, means for rocking said shaft, a head secured to the shaft and provided with a socket extending therethrough transversely of the shaft, a lever pivoted to the head and extended across one end of the socket, a coil spring in said socket for rocking the lever in one direction, an arm secured to said lever and a wiper carried by said arm.

3. A windshield cleaner comprising a rock shaft, means for rocking said shaft, a head secured to the shaft and provided with a slot, a lever pivoted to the head and extended into said slot to move therein, an arm secured to the lever, a wiper carried by the arm, and a spring in the head engaging the portion of the lever which extends into the slot and exerting pressure on said lever to force the wiper into engagement with the windshield.

4. A windshield cleaner comprising a rock shaft, means for rocking said shaft, a head secured to the shaft and provided with a socket extending therethrough tranversely of the shaft, said head having a slot extending diametrically of the socket lengthwise of the rock shaft, an adjusting screw in one end of the socket, a lever pivoted to and between the walls of the slot and extending across the socket, an arm on the lever, a wiper carried by the arm, and a spring in the socket between said screw and lever for yieldingly holding the wiper against the windshield.

In witness whereof I have hereunto set my hand this 24th day of March 1922.

WILLIAM J. BEAGLE.

Witnesses:
 H. E. CHASE,
 M. C. RILL.